(12) United States Patent
Misawa

(10) Patent No.: US 8,711,279 B2
(45) Date of Patent: *Apr. 29, 2014

(54) CAMERA WITH MONITOR

(75) Inventor: Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 405 days.

This patent is subject to a terminal disclaimer.

(21) Appl. No.: 13/231,581

(22) Filed: Sep. 13, 2011

(65) Prior Publication Data

US 2012/0019701 A1 Jan. 26, 2012

Related U.S. Application Data

(63) Continuation of application No. 11/402,801, filed on Apr. 13, 2006, now Pat. No. 8,035,731, which is a continuation of application No. 09/286,906, filed on Apr. 6, 1999, now Pat. No. 7,110,040.

(30) Foreign Application Priority Data

Apr. 6, 1998 (JP) .................................. 10-092983

(51) Int. Cl.
*H04N 5/225* (2006.01)
*H04N 5/222* (2006.01)

(52) U.S. Cl.
USPC .................................. 348/373; 348/333.01

(58) Field of Classification Search
CPC ............... H04N 5/23293; H04N 5/772; G06F 3/03547; G06F 3/04886; G06F 2203/04803
USPC .......................................... 348/231.7, 231.9
See application file for complete search history.

(56) References Cited

U.S. PATENT DOCUMENTS

| | | | |
|---|---|---|---|
| 4,977,456 A | 12/1990 | Furuya | |
| 5,414,413 A * | 5/1995 | Tamaru et al. | 345/175 |
| 5,515,104 A | 5/1996 | Okada | |
| 5,729,289 A | 3/1998 | Etoh | |
| 5,742,339 A | 4/1998 | Wakui | |
| 5,850,576 A | 12/1998 | Matsuzawa | |
| 5,898,600 A | 4/1999 | Isashi | |
| 5,943,043 A * | 8/1999 | Furuhata et al. | 345/173 |
| 6,065,015 A | 5/2000 | Kazami | |
| 6,169,568 B1 | 1/2001 | Shigetomi | |
| 6,342,900 B1 * | 1/2002 | Ejima et al. | 348/333.01 |
| 7,110,040 B1 | 9/2006 | Misawa | |
| 7,154,544 B2 * | 12/2006 | Kowno et al. | 348/240.99 |

(Continued)

FOREIGN PATENT DOCUMENTS

| | | |
|---|---|---|
| JP | 1-292321 A | 11/1989 |
| JP | 01-320871 | 12/1989 |

(Continued)

*Primary Examiner* — Luong T Nguyen
(74) *Attorney, Agent, or Firm* — Birch, Stewart, Kolasch & Birch, LLP

(57) ABSTRACT

A monitor with a large screen is provided at the back of the camera. In the recording mode, a preview image or a captured image is displayed in a part of the monitor where there is little possibility of being covered by the hand of the operator. In the reproducing mode, a reproduced image is displayed on substantially the entire screen of the monitor. A touch panel is provided over the monitor, and operation buttons such as a zoom operation button and an exposure correcting button are displayed on a part of the monitor where no image is displayed in the recording mode. Therefore, the part of the monitor can also be used as a camera operational part.

2 Claims, 4 Drawing Sheets

(56) References Cited

U.S. PATENT DOCUMENTS

| | | |
|---|---|---|
| 7,920,199 B2 * | 4/2011 | Kitsugi et al. ........... 348/333.02 |
| 2001/0012065 A1 | 8/2001 | Ejima et al. |
| 2002/0008763 A1 | 1/2002 | Kawamura et al. |
| 2002/0057351 A1 | 5/2002 | Suzuki et al. |
| 2005/0219383 A1 | 10/2005 | Ikeda |

FOREIGN PATENT DOCUMENTS

| | | |
|---|---|---|
| JP | 1-321784 A | 12/1989 |
| JP | 6 138714 A | 5/1994 |
| JP | 07023259 A | 1/1995 |
| JP | 8-6532 A | 1/1996 |
| JP | 8-88784 A | 4/1996 |
| JP | 8-139971 A | 5/1996 |
| JP | 8-317324 A | 11/1996 |
| JP | 9-44143 A | 2/1997 |
| JP | 09037129 A | 2/1997 |
| JP | 10-49128 A | 2/1998 |
| JP | 10-65943 A | 3/1998 |
| JP | 11-164175 A | 6/1999 |

* cited by examiner

F I G. 6
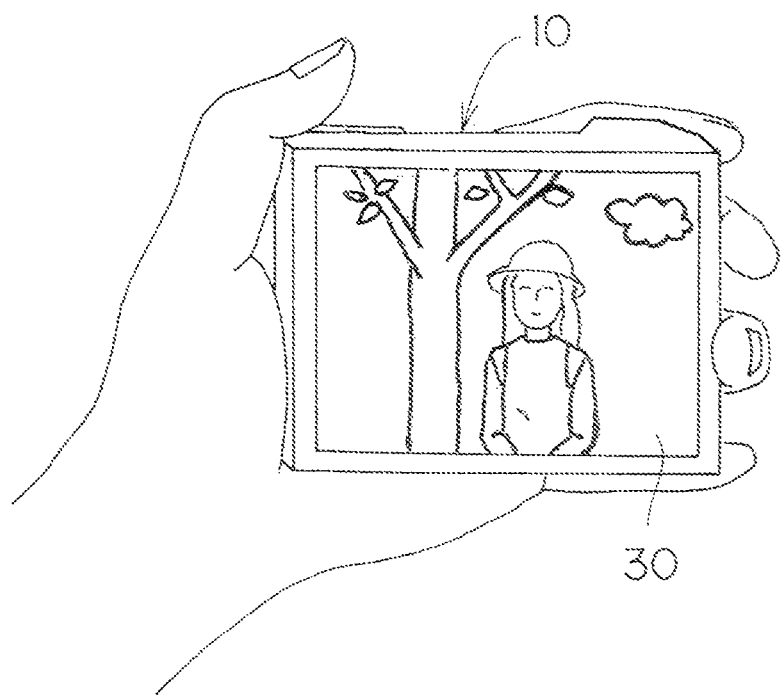

CAMERA WITH MONITOR

CROSS-REFERENCE TO RELATED APPLICATIONS

This application is a Continuation Application of application Ser. No. 11/402,801, filed Apr. 13, 2006 now U.S. Pat. No. 8,035,731, which is a Continuation Application of application Ser. No. 09/286,906 filed on Apr. 6, 1999 now U.S. Pat. No. 7,110,040, for which priority is claimed under 35 U.S.C. §120, which is an application claiming priority from Japanese Application No. 10-092983 filed Apr. 6, 1998, under 35 U.S.C. §119 and 37 C.F.R. §155(a). The entire contents of each of the above-identified applications are hereby incorporated by reference.

BACKGROUND OF THE INVENTION

1. Field of the Invention

This invention relates generally to a camera with a monitor, and more particularly to a camera with a monitor, which is applicable to an electronic camera that is provided with a thin monitor such as a liquid crystal display.

2. Description of Related Art

Some electronic cameras such as a digital camera are provided with a monitor such as a liquid crystal display (LCD) at the back thereof, which shows a preview image, which is a captured image before recording, and a recorded image thereon. A wide variety of electronic cameras have been developed: for example, an electronic still camera that can function as a cellular phone (Japanese Patent Provisional Publication No. 9-37129) and an electronic camera that can function as an electronic datebook (Japanese Patent Provisional Publication No. 7-23259). These cameras are also provided with the LCD monitor.

The electronic cameras have quickly become smaller, but at the same time, a larger LCD monitor has become desirable in order to show an image dynamic or having punch thereon.

If the LCD monitor has a large screen covering a large part of the camera, it is necessary to reduce the size of a grip, which is held by a hand of an operator of the camera. Thus, it is difficult for the operator to hold the camera. If the hand holding the camera covers the screen of the LCD monitor, it is impossible to see the entire image.

SUMMARY OF THE INVENTION

In view of the foregoing, it is an object of the present invention to provide a camera with a monitor, which enables the reproducing of a dynamic image on a large screen and makes it possible to confirm the entire image at the time of recording since the hand holding the camera does not cover and hide the image.

To achieve the above-mentioned object, the present invention is directed to a camera comprising: an imaging part for capturing an image of a subject; a selector for selecting one of a recording mode and a reproducing mode; a recording part for recording the image captured by the imaging part on a recording medium upon receiving a command to record in the recording mode; a reproducing part for reproducing an image from the recording medium in the reproducing mode; a monitor for displaying an image; and a display controller for controlling the monitor to display the image captured by the imaging part on a first area on the monitor in the recording mode, and to display the image reproduced from the recording medium on a second area on the monitor in the reproducing mode, the first area being smaller than the second area.

According to the present invention, if the reproducing mode is set by the mode selector, the image data is read from the recording medium and the image reproduced from the read data is displayed on substantially the entire screen of the monitor. In the recording mode, the image captured by the imaging part is reduced and is displayed only in a part of the monitor, where there is little possibility of being covered with the hand of the operator. It is therefore possible to recognize the composition of the captured image.

In the camera according to the present invention, a touch panel is provided over the monitor, and operation buttons are displayed in an area where no image is displayed in the recording mode, so that the monitor with the touch panel can also be used as a camera operational part.

To achieve the above-mentioned object, the present invention is directed to a camera comprising: an imaging part for capturing an image of a subject; a monitor for displaying the image captured by the imaging part; a touch panel arranged over the monitor; and a display controller for determining, by the touch panel, an area on the monitor hidden by a matter touching the touch panel, and controlling the monitor to display the image on an area on the monitor excluding the hidden area. According to the present invention, the image captured by the imaging part is displayed on an area on the monitor where any matter including the hand of the operator does not cover and hide the image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is an explanation drawing showing how the electronic camera is used in a reproducing mode.

DETAILED DESCRIPTION OF THE PREFERRED EMBODIMENT

This invention will be described in further detail by way of example with reference to the accompanying drawings.

Figure 1:
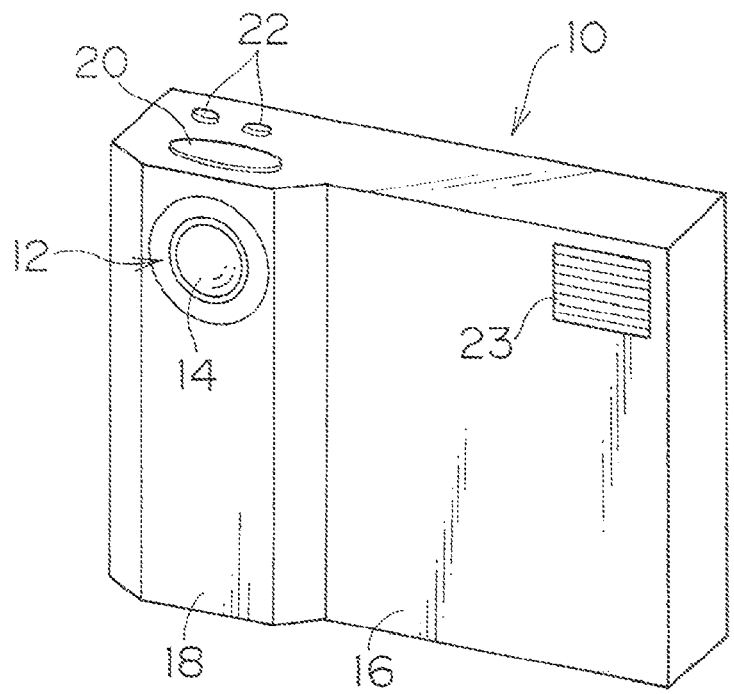
FIG. 1 is a front view of an electronic camera according to an embodiment of the present invention.
Figure 2:
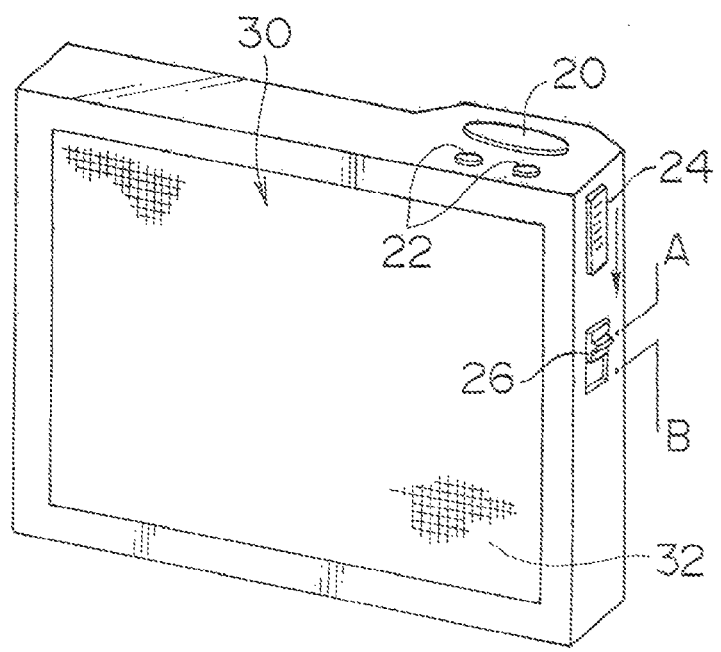
FIG. 2 is a back view of the electronic camera in FIG. 1.

FIG. 1 is a front view of an electronic camera according to an embodiment of the present invention, and FIG. 2 is a back view thereof. As shown in FIGS. 1 and 2, an imaging part 12 is provided at the upper left corner on the front face of a body 16 of the electronic camera 10, and the imaging part 12 has a taking lens 14 and a CCD (not shown) disposed behind the taking lens 14. Although not illustrated in detail, the taking lens 14 is, for example, a rear focusing zoom lens composed of variable frame lenses and correcting lenses.

A grip 18 is formed at the left side of the body 16 so that an operator can easily hold the camera 10 with the right hand. A recording button 20 and frame switching buttons 22 for switching reproduced images are provided at the top of the body 16. A strobe (an auxiliary light emitting part) 23 is provided at the upper right corner on the front face of the body 16.

A power switch 24 and a mode switch 26 (see FIG. 2) are provided at the side of the grip 18. The power switch 24 is used to turn on and off the camera 10, and the mode switch 26 is used to switch the function (mode) of the camera 10. The power switch 24 is vertically slidable, and sliding the power switch 24 downward turns on and off the camera 10 alternately. The power switch 24 is pressed upward by a pressing means (not shown), and the pressing means returns the power switch 24 to the original position (the upper position) when the operator's finger is removed from the power switch 24.

The mode switch 26 is also vertically slidable. Stopping the mode switch 26 at an upper position A sets a recording mode, and stopping the mode switch 26 at a lower position B sets a reproducing mode.

As shown in FIG. 2, a monitor 30 is provided at the back of the electronic camera 10. For example, the monitor 30 is an LCD of the maximum size with respect to the body 16 to such an extent that the screen extends to a part opposite to the grip 18. A light transmissible touch panel 32 is arranged over the face of the monitor 30.

Figure 3:
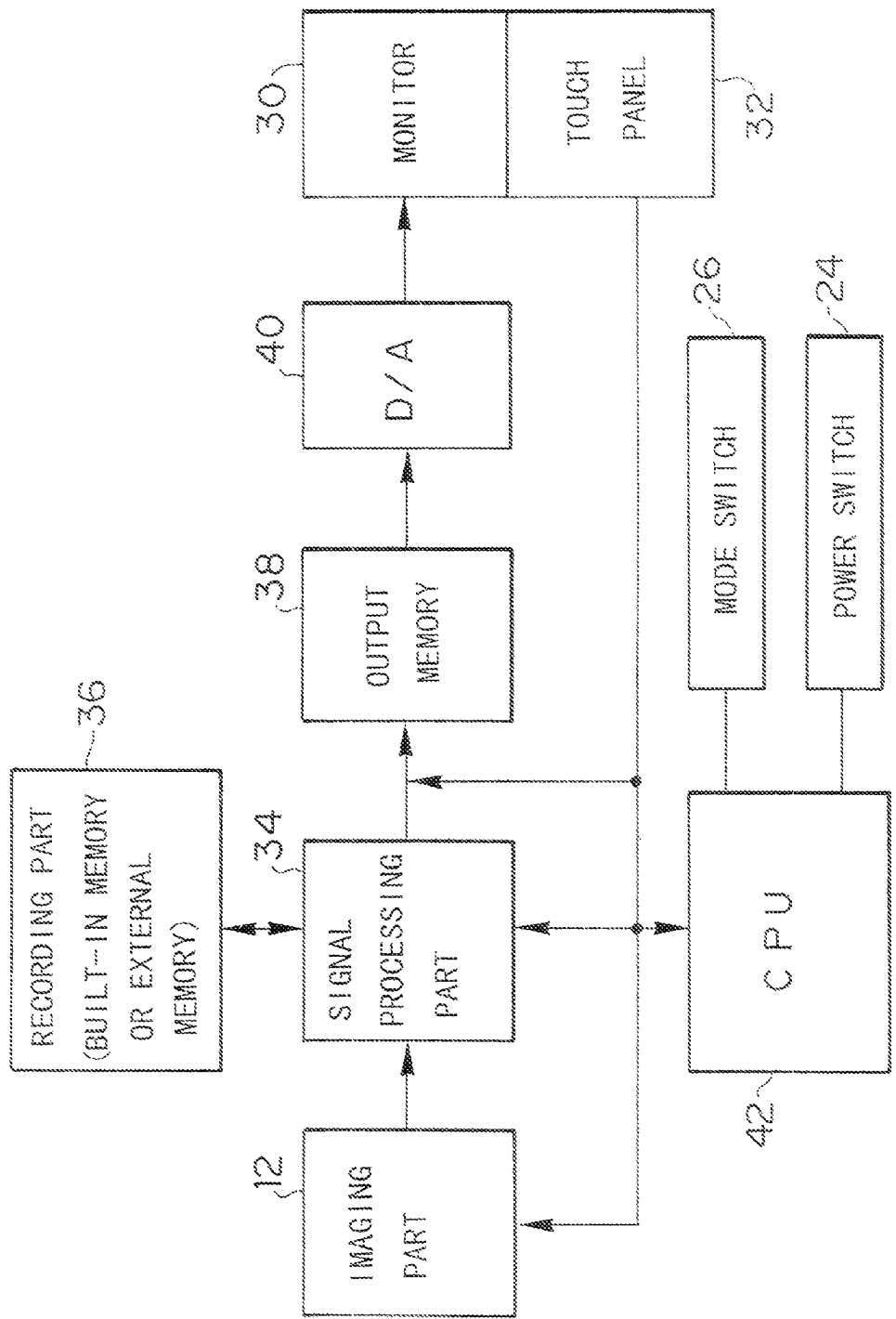
FIG. 3 is a block diagram showing the inner structure of the electronic camera in FIG. 1.

FIG. 3 is a block diagram showing the structure of the electronic camera 10. The electronic camera 10 comprises the imaging part 12, a signal processing part 34, a recording part 36 including a built-in memory or a detachable external memory, an output memory 38, a D/A converter 40, the monitor 30, the touch panel 32, and a central processing unit (CPU) 42.

In the imaging part 12, an image of a subject is formed on a light receiving surface of the CCD through the taking lens 14, and the image is photoelectrically converted by the CCD to be read as an image signal. Although not illustrated in detail, the signal processing part 34 includes analog processing circuits such as a CDS clamp circuit and a gain adjusting circuit, an A/D converter, digital image processing circuits such as a luminance signal generating circuit, a color differential signal generating circuit and a gamma correcting circuit.

The signal processing part 34 processes the image signal read from either the imaging part 12 and the recording part 36, and the image signal is transmitted to the output memory 38. The image is displayed on the screen of the monitor 30. The monitor 30 shows not only a still image, which is designated to be record by pressing the recording button 20, but the preview images before the recording button 20 is pressed such as a motion picture and an intermittent motion picture.

The electronic camera 10 has the well-known automatic exposure (AE) adjustment function and an auto-focusing (AF) function. When the operator turns the imaging part 12 to the subject, the optimum exposure adjustment and focusing are performed automatically.

When the recording button 20 is pressed in the recording mode, a recording start signal is generated. In response to the recording start signal, the signal processing part 34 processes the image signal read from the imaging part 12. The image signal is recorded in the recording part 36 on the built-in memory (e.g., a flash memory) or the detachable external memory card in accordance with an exchangeable image file (Exif) format or other formats. The recording start signal may be transmitted from the outside of the camera 10.

The CPU 42 supervises the circuits, and it controls the screens on the monitor 30 in accordance with signals from the operational part such as the mode switch 26. The CPU 42 also determines a touched position on the touch panel 32 in accordance with a signal from the touch panel 32, and controls the imaging part 12 for zooming and focusing, etc. and the read/write of the image data with respect to the recording part 32.

A description will now be given of the monitor display function of the electronic camera 10, which is constructed in the above-mentioned manner.

Figure 4:
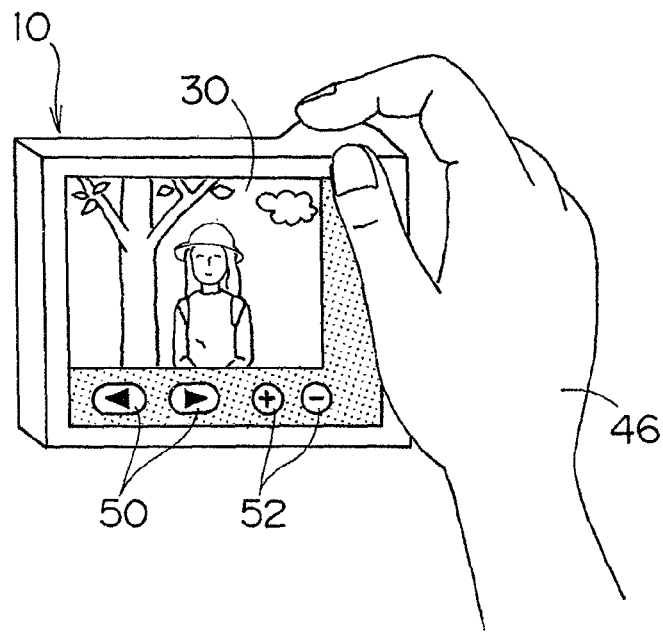
FIG. 4 is an explanation drawing showing how the electronic camera is used in a recording mode.

FIG. 4 shows an example of the screen on the monitor 30 in the recording mode.

If the recording mode is selected with the mode switch 26, a reduced preview image is displayed at the left of the screen of the monitor 30 in FIG. 4 such that the preview image is displayed on an area on the monitor 30 excluding an area covered and hidden with the hand (right hand) 46 of the operator holding the grip 18.

In the recording mode, the operator usually holds the grip 18 with the right hand 46 as shown in FIG. 4. In this case, the hand 46 of the operator covers an area of the screen on the monitor 30 (at the right end of the monitor 30 in FIG. 4). If the image is displayed on the covered area, the operator cannot see the image or recognize the composition of the whole image. If the operator changes the positions of the hand 46 to uncover the whole screen on the monitor 30, the camera 10 cannot be held steadily. To address this problem, the image is reduced and displayed at the left of the screen to exclude the area covered with the hand 46. Consequently, the operator can look at the whole image while holding the camera 10 steadily.

The area where the image is displayed in the recording mode is predetermined in view of the normal camera holding. Alternatively, the touched area on the monitor 30 is determined with the touch panel 32, and the image display area is bounded to exclude the touched area.

Figure 5:
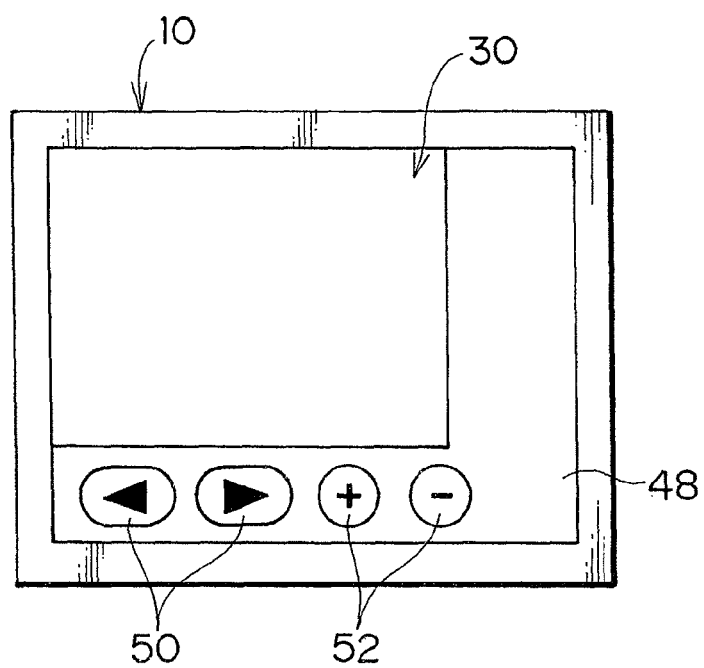
FIG. 5 is a view showing an example wherein an image is displayed on a monitor in the recording mode.

As shown in FIG. 5, operation icons or buttons such as zoom operation buttons 50 and exposure correcting (brightness correcting) buttons 52 are displayed on an area on the screen of the monitor 30 where the preview image is not displayed (at the right edge and the bottom edge of the monitor 30). The camera 10 is operated properly by touching the operation buttons 50 & 52 on the touch panel 32.

The operation buttons may be a strobe ON/OFF switch button and a color/black-and-white switch button. Even if not all of the operation buttons can be displayed at a time, it is possible to input a variety of commands by turning pages on the screen or selecting items on a menu screen.

If the composition is determined while the captured image is displayed on the monitor 30 as described above and the recording button 20 is pressed, the image is frozen on the monitor 30 and the image signal read from the CCD is recorded in the recording part 36 after a predetermined processing. After the recording, the frozen image is cancelled to display a motion picture or an intermittent motion picture again.

A description will now be given of the reproducing mode.

FIG. 6 shows the monitor 30 in the reproducing mode. If the reproducing mode is selected with the mode switch 26, the reproduced image is displayed on the entire area of the monitor 30. If a part of the screen (e.g. at the right, left and/or bottom edge) is used as the operational part with the touch panel 32, the reproduced image is displayed on substantially the entire area except for the operational part.

In the reproducing mode, the image data is read from the recording part 36 and the image represented by the image data is reproduced on the monitor 30, or the image is reproduced on the monitor 30 in accordance with the image data transmitted from external equipment (not shown) such as a personal computer through a communication function and an input/output terminal (not shown).

When the reproduced image is displayed on the monitor 30 in the reproducing mode, the operator usually holds the electronic camera 10 in the palm of the hand as shown in FIG. 6. Since it is unnecessary to direct the imaging part 12 to the subject, the operator can hold the camera 10 without covering the monitor 30. Thus, the dynamic reproduced image can be displayed on substantially the entire screen of the monitor 30 as shown in FIG. 6 in the reproducing mode. The reproduced images read from the recording part 36 or a storage medium of the external equipment can be switched by operating the frame switching buttons 22 during the reproducing. Operating one of the frame switching buttons 22 switches the reproduced images on a frame-by-frame basis in a recorded order, and operating the other of the frame switching buttons 22 switches the reproduced images on a frame-by-frame basis in an order reverse to the recorded order.

The electronic camera 10 may include an image size switching button (not shown) at the camera body 16 or on the screen of the monitor 30. Operating the image size switching button switches the small image as shown in FIG. 4 and the large image shown in FIG. 6 alternately on the monitor 30 anytime during the reproducing of the image. When the reduced image is displayed, it is preferable to display a color correcting button, a reproducing zoom operation button and a sepia tone display button on an area 48 in FIG. 5 where no image is displayed. This enables the color correction, the expansion/reduction of the image, the changeover to the sepia tone, or the like during the reproducing.

In this embodiment, the large screen (in FIG. 6) and the small screen (in FIG. 4) are switched in accordance with the operation of the mode switch 26. Alternatively, it is possible to automatically switch the large screen to the small screen when the touch panel 32 detects that a matter or the hand holding the grip 18 touches the touch panel 32 over the monitor 30. It is also possible to maintain the large screen even in the recording mode if the camera 10 is detected as being fixed to a tripod, etc.

In this embodiment, the image is displayed on the left portion of the monitor 30 during the recording in view of the case that the operator holds the camera 10 with the right hand (see FIGS. 4 and 5). The operator, however, may also hold the camera 10 with the left hand. If the touch panel 32 detects that the operator holds the camera 10 with the left hand, the reduced image is displayed on the right portion of the monitor 30 so as to avoid the area covered with the left hand.

In this embodiment, the electronic camera records the captured image by electronically recording the image data in the memory. The present invention, however, may also be applied to a silver halide camera with a monitor, which uses a silver halide film for the purpose of recording the captured image.

As set forth hereinabove, the camera of the present invention has the monitor with the large screen, and displays the reduced image only in the area where there is little possibility of being covered by the hand of the operator in the recording mode. In the reproducing mode, the large image is displayed on substantially the entire screen of the monitor. Thus, the operator can see the dynamic image in the reproducing mode and easily confirm the composition of the image in the recording mode.

In particular, the touch panel is provided over the monitor, and the operation buttons such as the exposure correcting button and the zoom operation button are displayed in the area where no image is displayed in the recording mode. Therefore, the screen of the monitor can be used as the operational part.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera comprising:
an imaging part for capturing an image of a subject;
a monitor with a screen for displaying the image obtained through the imaging part; and
a touch panel arranged over the monitor,
wherein the screen includes an area that displays the image and the screen includes an area that does not display the image, at least a portion of the area that does not display the image being covered and hidden by a hand gripping the electronic camera when the imaging part is faced at an object;
wherein an operational button is displayed on the area that does not display the image on the monitor where the image is not displayed, in a recording mode, the monitor thereby providing an operational part operable via the touch panel; and
wherein a release button is provided on the ceiling part of the electronic camera, and the area that does not display the image corresponds to an area of the screen where the image will not be displayed and where the thumb on a hand of a photographer might cover when the photographer holds the electronic camera by putting the index finger of the hand on the release button on the ceiling part of the electronic camera in order to operate the release button when in the recording mode,
wherein at least a side of the screen corresponding to the hand comprises the area that does not display the image, and
wherein in the recording mode the area that displays the image is determined based on a location on the screen where the thumb of the photographer is placed on the touch panel.

2. An electronic camera comprising:
an imaging part for capturing an image of a subject;
a monitor with a screen for displaying the image obtained through the imaging part; and
a touch panel arranged over the monitor,
wherein the screen includes an area that displays the image and the screen includes an area that does not display the image, at least a portion of the area that does not display the image being covered and hidden by a hand gripping the electronic camera when the imaging part is faced at an object;
wherein an operational button is displayed on the area that does not display the image on the monitor where the image is not displayed, in a recording mode, the monitor thereby providing an operational part operable via the touch panel;
wherein a release button is provided on the ceiling part of the electronic camera,
wherein when a photographer holds the electronic camera by putting the index finger of a hand on the release button on the ceiling part of the electronic camera, the operational button is displayed in an monitor area of the screen not hidden by the thumb of the hand, when in the recording mode,
wherein at least a side of the screen corresponding to the hand comprises the area that does not display the image, and
wherein in the recording mode the area that displays the image is determined based on a location on the screen where the thumb of the photographer is placed on the touch panel.

* * * * *